(12) United States Patent
Acar et al.

(10) Patent No.: US 7,224,827 B2
(45) Date of Patent: May 29, 2007

(54) METHOD FOR MATCHING AND REGISTERING MEDICAL IMAGE DATA

(75) Inventors: Burak Acar, Bebek (TR); Christopher F. Beaulieu, Los Altos, CA (US); David S. Paik, Palo Alto, CA (US); Sandy A. Napel, Menlo Park, CA (US); R. Brooke Jeffrey, Los Altos Hills, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 688 days.

(21) Appl. No.: 10/673,089

(22) Filed: Sep. 26, 2003

(65) Prior Publication Data

US 2004/0136584 A1 Jul. 15, 2004

Related U.S. Application Data

(60) Provisional application No. 60/414,104, filed on Sep. 27, 2002.

(51) Int. Cl.
*G06K 9/00* (2006.01)
(52) U.S. Cl. .................... 382/131; 382/256; 378/21
(58) Field of Classification Search ............... 382/128, 382/129, 130, 131, 132, 133, 154, 168, 203, 382/209, 232, 256, 260, 274, 285–297; 600/407, 600/560; 434/262, 267; 345/420; 378/21, 378/23
See application file for complete search history.

(56) References Cited

U.S. PATENT DOCUMENTS

| 5,458,111 | A | * | 10/1995 | Coin ........................ 600/560 |
|---|---|---|---|---|
| 5,491,627 | A | | 2/1996 | Zhang et al. |
| 5,891,030 | A | * | 4/1999 | Johnson et al. ............. 600/407 |
| 5,920,319 | A | * | 7/1999 | Vining et al. ............... 345/420 |
| 5,971,767 | A | * | 10/1999 | Kaufman et al. ........... 434/267 |
| 6,083,162 | A | * | 7/2000 | Vining ........................ 600/407 |
| 6,246,784 | B1 | * | 6/2001 | Summers et al. ........... 382/128 |
| 6,331,116 | B1 | * | 12/2001 | Kaufman et al. ........... 434/262 |
| 6,345,112 | B1 | | 2/2002 | Summers et al. |
| 6,556,696 | B1 | | 4/2003 | Summers et al. |
| 2002/0039400 | A1 | | 4/2002 | Kaufman et al. |

(Continued)

OTHER PUBLICATIONS

H. Yoshida et al. in a paper entitled "CAD Techniques, Challenges, and Controversies in Computed Tomographic Colonography". Published in Springer and Business Media, Inc. 2004 (p;. 26-41).

(Continued)

*Primary Examiner*—Jingge Wu
*Assistant Examiner*—Seyed Azarian
(74) *Attorney, Agent, or Firm*—Lumen Intellectual Property Services, Inc.

(57) ABSTRACT

An automatic method for the registration of prone and supine computed tomographic colonography data is provided. The method improves the radiologist's overall interpretation efficiency as well as provides a basis for combining supine/prone computer-aided detection results automatically. The method includes determining (centralized) paths or axes of the colon from which relatively stationary points of the colon are matched for both supine and prone positions. Stretching and/or shrinking of either the supine or prone path perform registration of these points. The matching and registration occurs in an iterative and recursive manner and is considered finished based on one or more decision criteria.

13 Claims, 5 Drawing Sheets

U.S. PATENT DOCUMENTS

2003/0161522 A1     8/2003     Campanini et al.
2003/0172043 A1     9/2003     Guyon et al.

OTHER PUBLICATIONS

D.S. Paik, et al. 1998, "Automated flight path planning for virtual endoscopy", Medical Physics 25 (5), 629-637.

J.G. Fletcher, et al., "Optimization of CT colonography technique: prospective trial in 180 patients," *Radiology*, vol. 216(3), pp. 741-711, 2000.

J. Yee, et al., "The usefulness of glucagon hydrochloride for colonic distention in CT colonograpy," *Am J Roentgenol*, vol. 173(1), pp. 169-172, 1999.

Iordanescu et al., "Benefits of Centerline Analysis for CT Colonography Computer-Aided Polyp Detection", Medical Imaging, Proceedomgs of SPIE vol. 5031 (2003), pp. 388-397.

Wingo P.J., Cancer Statistics, ca Cancer Journal Clin, 1995; 45:8-30.

Thoeni R.F., Laufer I. "Polpys and cancer," Textbook of Gatrointestinal Radiology, Philiadelphia: W.B. Saunders, 1994; 1160.

Winawer S.J., Zauber A.G., Ho M.N., O'Brien M.J., Gottlieb L.S., Sternberg S.S., Waye J.D., et al. "Prevention of colorectal cancer by colonoscopic polypectomy." The national polyp study workgroup. N. Engl. J. Med. 1993; 329: 1977-1981.

Jerebko et al. "Computer-aided polyp detection in CT colonography using and ensemble of support vector machines" International Congress Series 1256 (2003) pp. 1019-1024.

K. Veropoulos et al. (1999) in a paper entitled "Controlling the sensitivity of support vector machines" and presented at the Int. Joint Conf. AI (IJCAI'99), Stockholm, Sweden.

DM Eddy (1990) entitled "Screening for colorectal cancer" and published in Ann. Intern Med., 113 373-384.

RM Summers et al. (2000) entitled Polypoid lesions of airways: early experience with computer-assisted detection by using virtual bronchoscopy and surface curvature and published in Radiology 208 (2):331-337.

Yoshida et al., (2000) in a paper entitled "Detection of colonic polyps in CT colonography based on geometric features" and published in Radiology 217 (SS):582-582.

SB Gokturk & C Tomasi (2000) in a paper entitled "A graph method for the conservative detection of polyps in the colon" and published at the 2nd International Symposium on Virtual Colonoscopy Nov. 2000 Boston, USA.

DS Paik et al. (2000) in a paper entitled Computer aided of polyps in CT colonograpy: Free response roc evaluation of performance and published in Radiology 217 (SS)370.

DS Paik et al. (1999) in a paper entitled "Detection of polyps in CT colonography: A comparison of a computer aided detection algorithm to 3-D visualization methods" and published n Radiology Society of North America 85th Scientific Session. Chicago, IL: Radiology Soc. N. Amer. p. 428.

MK Hu (1962) entited "Visual pattern recognition by moment invariants" and published in IRE transactions on information theory IT-8:179-187.

B. Scholkopf (1997) in a book entitled "Support Vector Learning" and published by Munich, Germany; R. Oldenbourg Verlag.

\* cited by examiner

METHOD FOR MATCHING AND REGISTERING MEDICAL IMAGE DATA

CROSS-REFERENCE TO RELATED APPLICATIONS

This application is cross-referenced to and claims priority from U.S. Provisional Application 60/414,104 filed Sep. 27, 2002, which is hereby incorporated by reference.

STATEMENT REGARDING FEDERALLY SPONSORED RESEARCH OR DEVELOPMENT

The present invention was supported in part by grant number RO1 CA72023 from the National Institutes of Health (NIH/NCI). The U.S. Government has certain rights in the invention.

FIELD OF THE INVENTION

The present invention relates generally to medical imaging. More particularly, the present invention relates to methods for matching and registering medical imaging data based on anatomical similarity.

BACKGROUND

Computed Tomographic Colonography (CTC) is a minimally invasive method for the examination of the colon using spiral/helical CT volume data. The standard imaging process includes colon cleansing and air-insufflation, followed by CT imaging of the abdomen while the patient is in the supine position. However, insufficient cleansing and air-insufflation often cause some parts of the colon wall to be covered with water (See e.g. S. C. Chen et al., "CT colonography: value of scanning in both the supine and prone positions," *Am J Roentgenol*, vol. 172(3), pp. 595–599, 1999; J. G. Fletcher, et al., "Optimization of CT colonography technique: prospective trial in 180 patients," *Radiology*, vol. 216(3), pp. 704–711, 2000; J. Yee, et al., "The usefulness of glucagon hydrochloride for colonic distention in CT colonography," *Am J Roentgenol*, vol. 173(1), pp. 169–172, 1999). Furthermore, retained solid fecal material can mimic a polyp in CT images (See e.g. J. G. Fletcher et al., "CT colonography: potential pitfalls and problem-solving techniques," *Am J Roentgenol*, vol. 172(5), pp. 1271–1278, 1999 (With comments in *Am J Roentgenol*, vol. 172(5), pp. 1179, 1999)). These limitations are largely overcome by imaging the colon a second time with the patient in the prone position. The radiologists then compare the two sets of images to assess for movement of feces and to examine surfaces hidden in supine position. This requires careful anatomic alignment between the two data sets. However, as the patients change position, their colons deform and may stretch or shrink in length. Currently, anatomic matching the two data sets is tedious and time consuming. Accordingly, there is a need for a more convenient and automatic method that would allow matching of these two data sets.

SUMMARY OF THE INVENTION

The present invention provides an automatic method for the registration of prone and supine Computed Tomographic Colonography (CTC) data. The method improves the radiologist's overall interpretation efficiency as well as provides a basis for combining supine/prone computer-aided detection results automatically. In general, the method matches and registers medical image data obtained from different perspectives or taken at different times. The medical image data could be obtained from other organs or (tubular) structures other than the colon such as blood vessels or airways, other areas of the gastrointestinal tract, and solid structures or organs that can be segmented, such as bones.

Once the medical images are obtained, e.g. supine or prone data of the colon, the method determines centralized paths or axes of the colon. The method then determines relatively stationary points, referred to as landmarks, along the centralized axis/path of the colon for both supine and prone positions. In one aspect, these landmarks are local extrema (minima and maxima along the path). These landmarks typically relate to known and automatically identifiable anatomical points or flexures of the colon and are used to match the data sets. Stretching and/or shrinking of either the supine or prone centralized path perform the registration of these landmarks. The stretching and/or shrinking could be performed in a linear or a non-linear fashion. The stretching and/or shrinking could be performed using one or more local extrema, n-th order derivations, curvatures, or the like. The method could be performed on either one of the x, y, z axis or any combination or order of these axes. The matching occurs in an iterative and recursive manner and is considered successful based on one or more decision criteria.

BRIEF DESCRIPTION OF THE FIGURES

The objectives and advantages of the present invention will be understood by reading the following detailed description in conjunction with the drawings, in which.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

Figure 1:
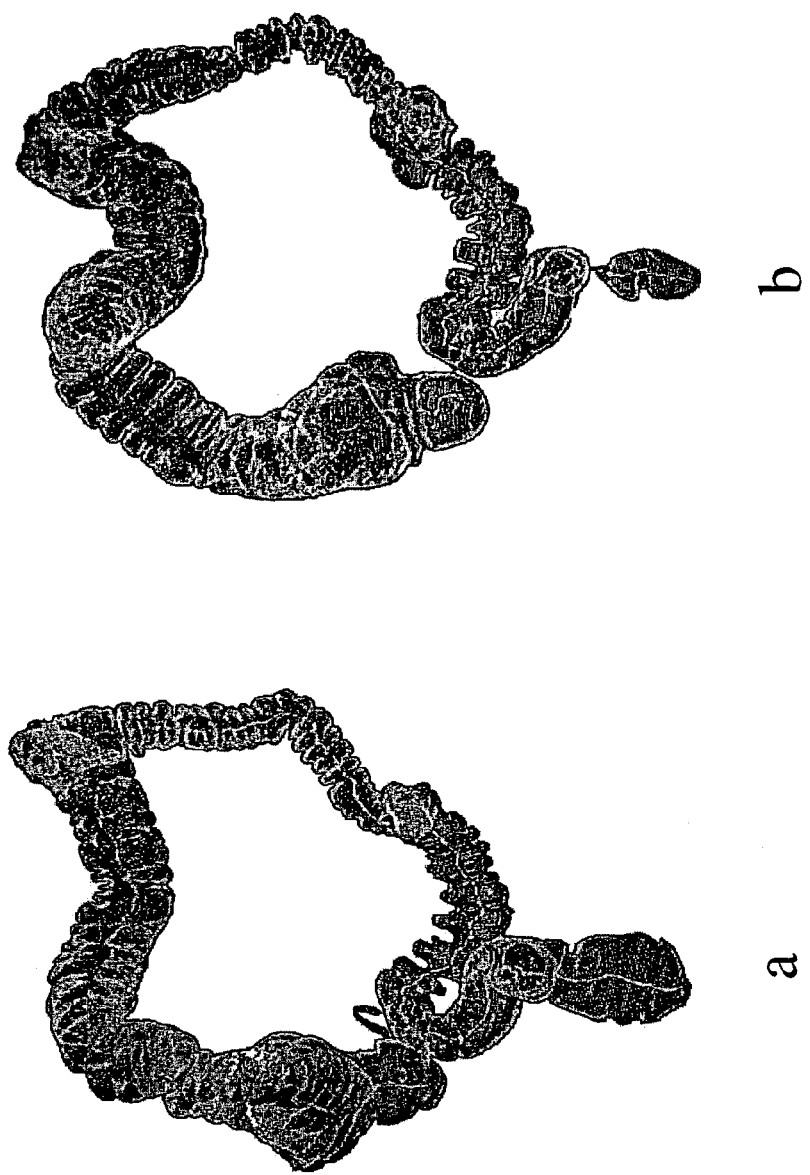
FIG. 1 shows an example of a 3D view of prone (a) and supine (b) colon images from one patient, which were segmented using fixed threshold intensity, according to the present invention.
Figure 2:
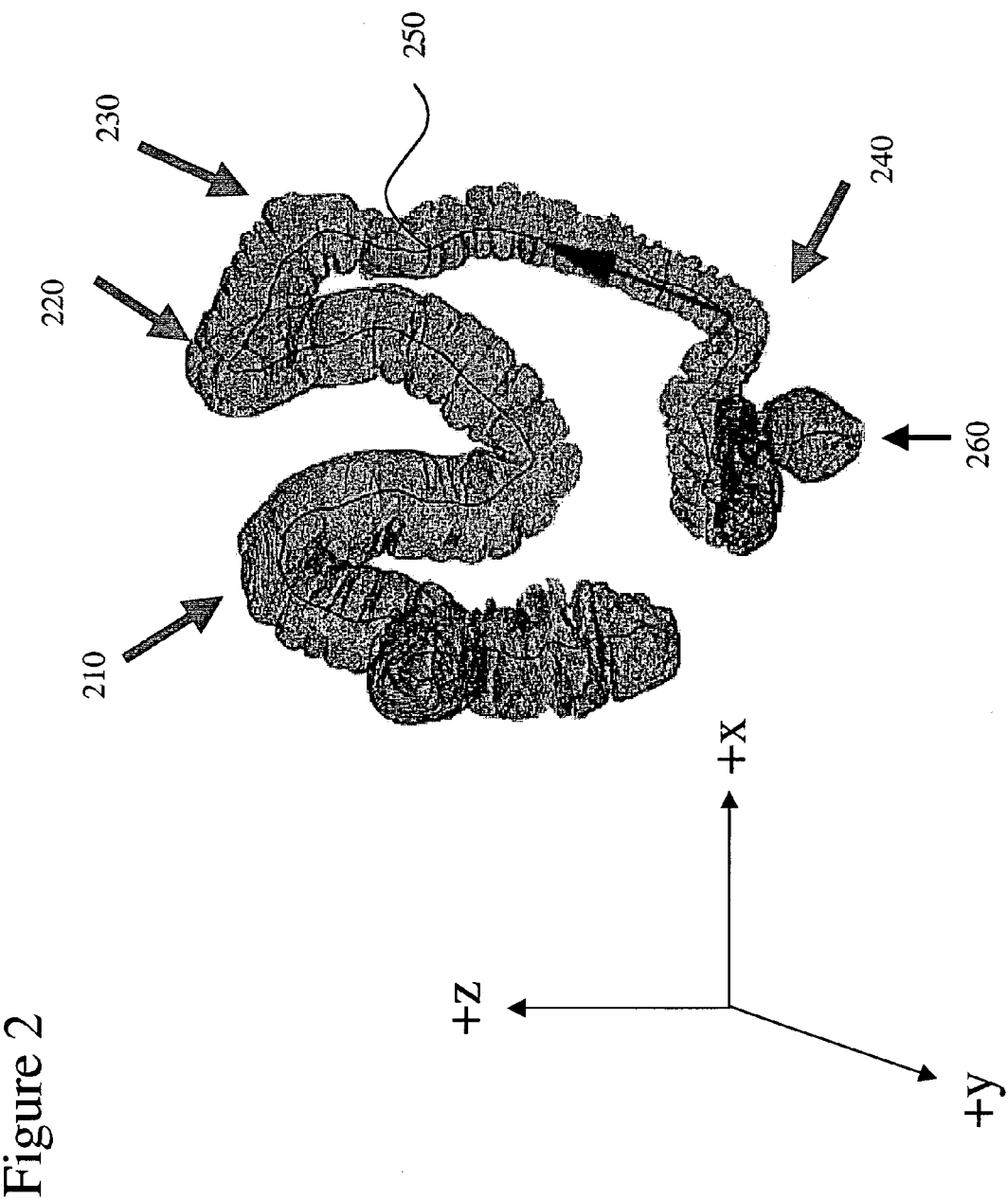
FIG. 2 shows an example in which arrows 210, 220, 230 and 240 show possible landmark locations and a centralized path 250 that the method of the present invention is capable of locating automatically.

Colon wall segmentations for both the 3-dimensional (3D) prone and supine CT data were generated using seeded region-growing at a fixed intensity threshold (FIG. 1). From the segmented colon, centralized paths through the colon were computed using a 3D medial axis transform, for instance sampled at 1 mm intervals, and stored as x, y, and z coordinates (See e.g. D. S. Paik et al. 1998, "Automated flight path planning for virtual endoscopy", Medical Physics 25 (5), 629–637) (FIG. 2). The centralized paths could also be computed with another method known in the art. Instead of using a centralized path, one could also use a path that can be obtained in a fairly consistent manner from the data sets. It would be preferred that the resulting (centralized) path is a fairly smooth path. In case the computed (centralized) path still contains a certain amount of noise, this noise could be filtered out with any type of digital filter known in the art.

The x, y, and z coordinates of the centralized path were used as the inputs to the matching and registration method. As a convention, the +z axis is from feet to head, the +x axis is from the left side of the patient to the right side, and the +y axis from posterior to anterior (See FIG. 2). Distances along the centralized path and the coordinates could be defined as relative to the initial path point at the anus 260.

Figure 3:
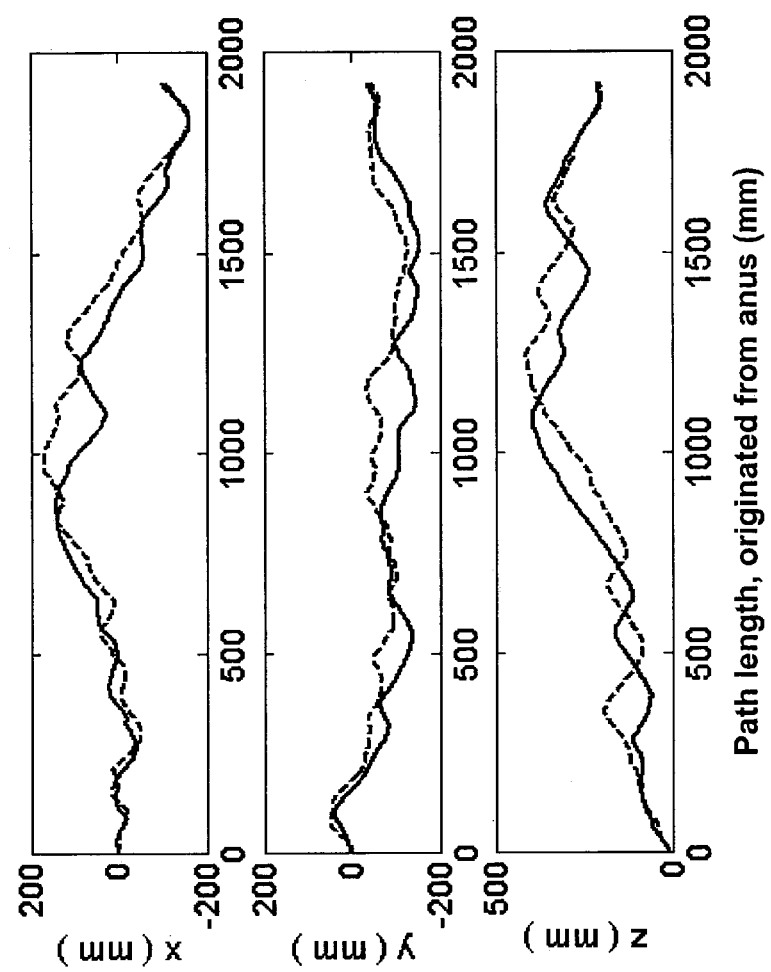
FIG. 3 shows an example of a colon centerline path, both supine (solid line) and prone (dashed line), as three functions of x, y and z coordinates versus path length originated from the anus.

The path coordinates of supine data ($x_s$, $y_s$, $z_s$) and prone ($x_p$, $y_p$, $z_p$) are functions of the distance along the centralized path, d. FIG. 3 shows an example of these six functions for a single patient. An important observation at this point is that $x_s$, $y_s$, $z_s$ resemble $x_p$, $y_p$, $z_p$ respectively in terms of their morphologies, but not at the location along the centralized path d. It is therefore the objective of the present invention to compare and match the data according to landmarks such as their anatomical feature and location on the respective centralized paths. Once correspondence between the landmarks is matched, linear and/or non-linear operations can be applied so that the matched landmarks coincide along the path. The description infra focuses on the z axis for the sake of simplicity, though the method can be similarly applied to any individual (or combination of) axis (axes).

Figure 4:
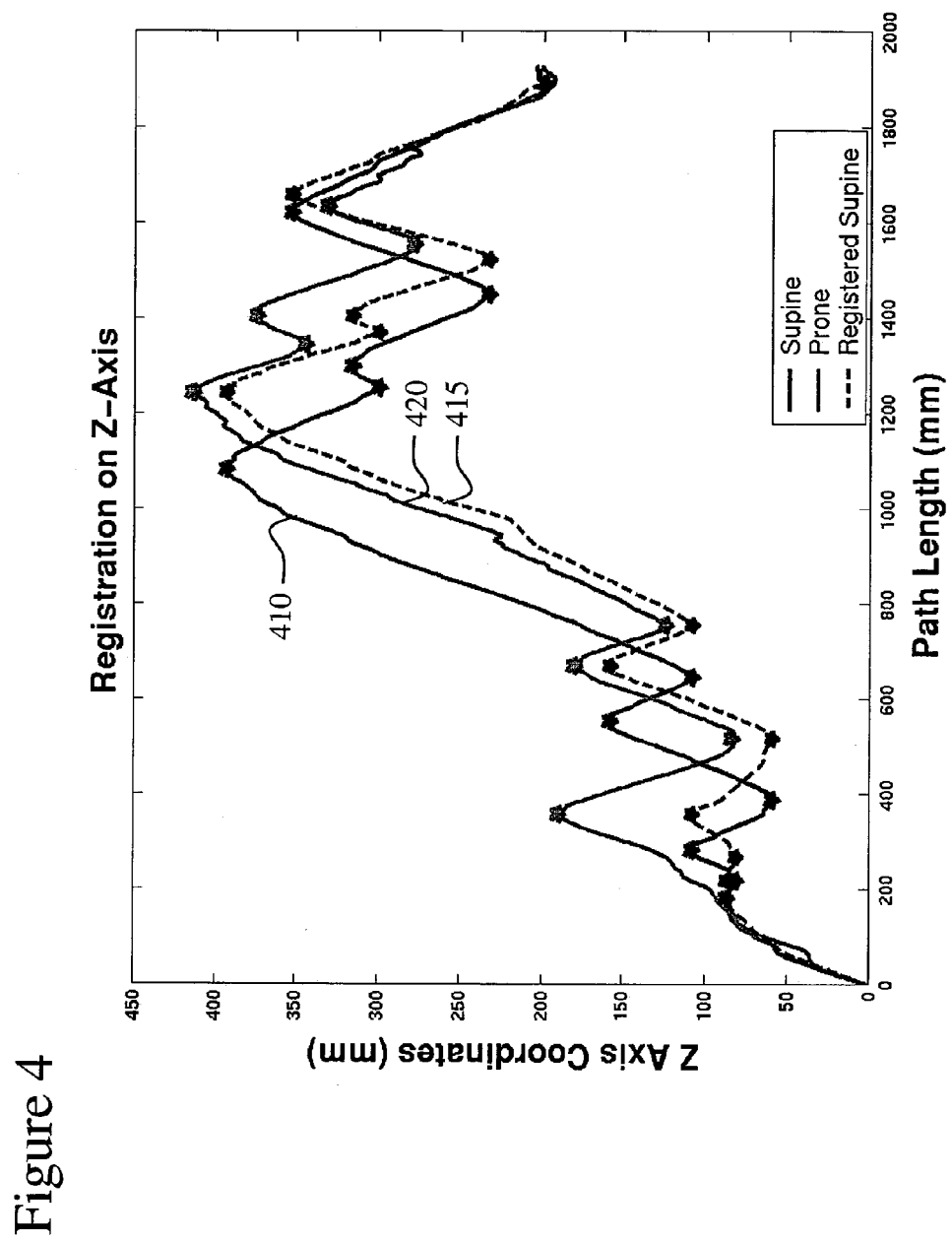
FIG. 4 shows an example of supine data (410 $z_s$) and prone data (420 $z_p$) before the registration and the supine data (415, dashed line) after it was matched/registered onto the prone data. The bold points on the curves show the local extrema (landmarks) that were identified and used for matching automatically.
Figure 5:
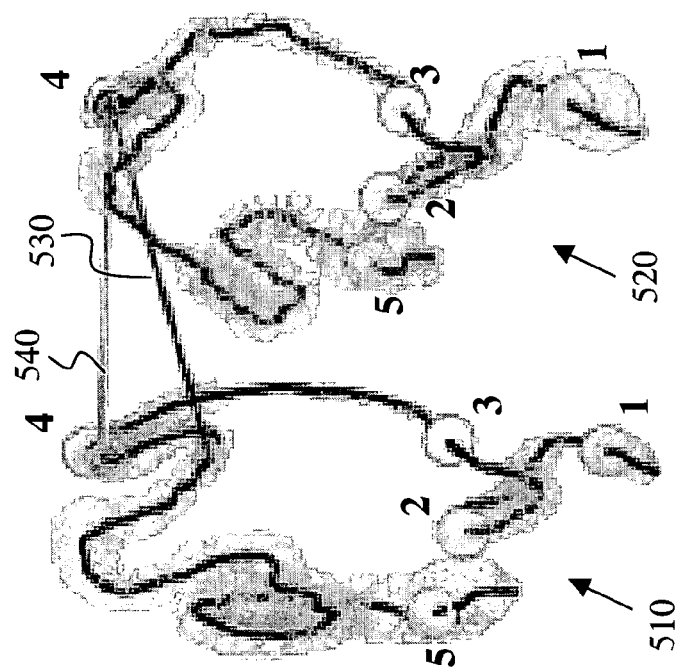
FIG. 5 shows an example of the colon centerlines for a supine (510) and prone (520) data with five anatomically identical points marked on each by a radiologist. The mapping between the two centerlines before (530) and after (540) the matching, in terms of the equal distance to the rectum along the centerlines, is also shown. It is clear that the matching method of the present invention achieves close correspondence between anatomically identical points (the correspondence between the $4^{th}$ anatomically identical points is shown).

The morphological similarity between $z_s$ and $z_p$ can be observed as a similarity between the number of landmarks; such as local extrema used in this particular example (LoP; including local minima or local maxima), and their order in terms of their z values as shown in FIG. 4. If one sorts the LoP's with respect to their z values, the LoP's of $z_s$ and $z_p$ with equal or close indices are more likely to correspond to the same anatomical points along the central paths. In anatomical terms, LoP's correspond to the deflection points of the central path of the colon and are used as landmarks for the method. It is noted that the method is not limited to the use of local extrema since other landmarks could be used such as n-th order derivations, curvatures, or the like.

Despite of the fact that these deflection points may move within the 3D volume (patient's abdomen) between supine and prone scans, they remain to be deflection points with (small) shifts in their locations to d. Furthermore, LoP's with larger z coordinate values typically correspond to relatively more stable anatomic points. They also correspond to the points further away from the anus 260, for example, LoP's with highest z values are the most superior locations in the colon. Anatomically these points typically correspond to the hepatic 210 and splenic 220 flexures (FIG. 2). These relatively fixed flexures are the endpoints of the much more mobile transverse colon. It is noted that LoP's along the other axes correspond with different anatomical points. In general, we have observed that between prone and supine scans the colon generally deviates less in z- than the y- or x-axis, and the colon is more likely to deform in y-axis than other two axes (i.e. misalignment between supine and prone data set).

The path matching method is based on coupling LoP's for the x-, y-, and z- axes. In a specific example, the path registration method is based on coupling of LoP's of $z_s$ and $z_p$ and registering their positions with respect to d by segmental stretching and/or shrinking of one of the two paths. The method is not limited to using the supine or prone data set as a reference to match the prone or supine data set respectively.

The first step is baseline adjustment of the two paths. It is assumed that the beginning and the ending point of the two paths (spPt and prPt) correspond to the same anatomical points, the anus and the tip of the cecum. Let the path length functions of the spPt and prPt be $D_s(i)=i, i\epsilon[1,N_s]$ and $D_p(i)=i, i\epsilon[1,N_p]$ respectively. A linear transformation, T, is applied such that:

$$D_p(1)=\hat{D}_s(1)=T(D_s(1)) \quad (1)$$

$$D_p(N_p)=\hat{D}_s(N_s)=T(D_s(N_s)) \quad (2)$$

This is equivalent to taking the first and last point of the two paths as two pairs of coupled LoP's of spPt and prPt and registering them with respect to d. The z values along the spPt are also changed linearly such that $z_s(1)=z_p(1)$ and $z_s(N_s)=z_p(N_p)$. Note that the linear transformation, T, is the mapping between spPt and prPt. It will be modified in the subsequent steps in a nonlinear fashion to yield to final piecewise linear mapping function.

The second step is to determine the LoP's. The landmarks (local extrema) of $z_s (\hat{D}_s)$ and $z_p (D_p)$ are determined using numerical derivation and neighboring extrema are clustered such that the minimum distance along the path between two consecutive clusters is for instance 15 mm. The mean location along the path and the mean z value for spPt and prPt (LoP_s's, i.e. LoP's on the supine data, and LoP_p's, i.e. LoP's on the prone data, respectively) are used. These identified LoP_s's and LoP_p's are ordered with respect to their z values and indexed. FIG. 4 shows the LoP_s's and LoP_p's for $z_s$ and $z_p$.

The next step is to find the LoP_s, LoP_p pair most likely to correspond to the same anatomical point. The decision criteria are based on the differences between their z values and their locations along the path.

$$i,j\epsilon\{1,2\} \text{ and} \quad (3)$$

$$|\hat{D}_s(LoP\_s(i))-D_p(LoP\_p(j))|<100 \text{ mm} \quad (4)$$

$$K<\hat{D}_s,D_p<L \quad (5)$$

where i and j are indices assigned to LoP's in the region of interest (ROI, defined by (5)) only with respect to their z values. Condition (3) forces the algorithm to match LoP's starting from the ones furthest away from the anus, i.e., the ones most likely to correspond to anatomical landmarks (like the hepatic and splenic flexures). Condition (4) is a constraint in the maximum stretching/shrinking allowed. In this example this maximum is set to 100 mm, however the maximum allowed stretching/shrinking could also be smaller or larger than 100 mm. Condition (5) defines the boundaries of ROI on which the registration is applied.

Initially, $K=D_p(N_p)=\hat{D}(N_s)$ and $L=D_p(1)=\hat{D}(1)$. Then a linear stretching/shrinking operation is applied to $\hat{D}_s$ such that:

$$T(\hat{D}_s(LoP\_s(i))=D_p(LoP\_p(j)) \qquad (6)$$

The method matches the right and left hand sides of the matched point recursively, for a pre-speficied level of recursions or until it could not find any pair of LoP's that satisfy the above criteria. The recursive matching and registration algorithm could be summarized as follows:

1. Perform baseline correction
2. Find LoP's
3. Initialize recursion_level=0 and K and L to set ROI
4. Sort and index LoP's in ROI
5. If recursion_level<max_recursion_level AND a pair of LoP's and LoP'p are matched based on equations (3), (4), (5)
   a. Update $\hat{D}_s$, based on equation (6)
   b. Increase recursion_level by 1
   c. $K_0=K$, $L_0=L$
   d. Set $K=\hat{D}_s(LoP\_s(i))=D_p(LoP\_p(j))$
   e. Go to step (4) (process right hand side)
   f. Set $K=K_0, L=\hat{D}_s(LoP\_s(i))=D_p(LoP\_p(j))$
   g. Go to step (4) (process left hand side)
6. Output $\hat{D}_s$ The method described supra for the z axis can be similarly applied to x and y axes exactly in the same way. The order in which the axes are considered can be iterated until it converges to a final $\hat{D}_s$ or for a pre-specified number of iterations. It will be clear that the number of axes can be selected as well as the order or the selected axes.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, the method is also applicable to path comparison and matching of other tubular structures such as blood vessels or airways, other areas of the gastrointestinal tract, and to solid structures that can be segmented such as bones. In addition, the method can be applied to other types of imaging data such as magnetic resonance imaging and ultrasound. Other possible variations to the current method and implementation relate to the fiducial point determination and pair-wise matching which could use the curvature and position information. The method could further be extended and refined by inclusion of several other types of information, such as torsion, estimated anatomical location, or the like. Another variation is that the piece-wise linear operations performed for matching can be refined by using non-linear operations. For example, the segments corresponding to the transverse colon can be registered by linear operations whereas nonlinear mappings can be used for the segments corresponding to the rectum. In one example, coupling is achieved by copying the most current mapping to other axes and matches/registers a segment at a time while keeping the other segments fixed. The iterative and recursive nature of the method can be extended by further including the information from axes and segments other than the one being registered, at the time of registration. All such variations are considered to be within the scope and spirit of the present invention as defined by the following claims and their legal equivalents.

What is claimed is:

1. A method for matching and registering medical image data, comprising the steps of:
   (a) obtaining a first image data set of a tubular structure;
   (b) obtaining a second image data set of said tubular structure;
   (c) determining a first path of said tubular structure in said first image;
   (d) determining a second path of said tubular structure in said second image;
   (e) determining landmarks in said first path;
   (f) determining landmarks in said second path;
   (g) matching said landmarks in said first path with said landmarks in said second path through identifying correspondence between said landmarks of said first path with said landmarks of said second path; and
   (h) registering said first path to said second path through stretching or shrinking of said first path to said second path until said corresponding landmarks in said first path and said second path coincide along said respective paths.

2. The method as set forth in claim 1, wherein the step of matching comprises the step of sorting and comparing the position of said landmarks in said first path with said landmarks of said second path based on anatomical information along said respective paths.

3. The method as set forth in claim 1, wherein the step of registering comprises the step of linear stretching or shrinking.

4. The method as set forth in claim 1, wherein the step of registering comprises the step of non-linear stretching or shrinking.

5. The method as set forth in claim 1, further comprising iterative and recursive steps until one or more decision criteria are met.

6. The method as set forth in claim 1, wherein said tubular structure is a colon, blood vessel or airways.

7. The method as set forth in claim 1, wherein said first image data set is based on computed tomography colonography data from a colon in supine position and wherein said second image data set is based on computed tomography colonography data from a colon in prone position.

8. The method as set forth in claim 1, wherein said first image data set is based on computed tomography colonography data from a colon in prone position and wherein said second image data set is based on computed tomography colonography data from a colon in supine position.

9. A method for registering computed tomography colonography data obtained in a supine position and in a prone position, comprising the steps of:
   (a) obtaining said computed tomography colonography data in said supine position;
   (b) obtaining said computed tomography colonography data in said prone position;
   (c) determining a first path in said computed tomography colonography data of said colon in said supine position;
   (d) determining a second path in said computed tomography colonography data of said colon in said prone position;
   (e) determining landmarks in said first path;
   (f) determining landmarks in said second path; and
   (g) matching said landmarks in said first path with said landmarks in said second path through identifying correspondence between said landmarks of said first path with said landmarks of said second path; and (h) registering said first path to said second path through stretching or shrinking of said first path to said second path until said corresponding landmarks in said first path and said second path coincide along said respective paths, or registering said first path to said second path through stretching or shrinking of said second path to said first path until said corresponding landmarks in said first path and said second path coincide along said respective paths.

10. The method as set forth in claim 9, wherein the step of matching comprises the step of sorting and comparing the position of said landmarks in said first path with said landmarks of said second path based on anatomical information along their respective paths.

11. The method as set forth in claim 9, further comprising the step of linear stretching or shrinking.

12. The method as set forth in claim 9, further comprising the step of linear stretching or shrinking.

13. The method as set forth in claim 9, further comprising iterative and recursive steps until one or more decision criteria are met.

* * * * *